US008583628B2

(12) United States Patent
Richter et al.

(10) Patent No.: US 8,583,628 B2
(45) Date of Patent: Nov. 12, 2013

(54) RECURSIVE DOCUMENT NETWORK SEARCHING SYSTEM HAVING MANUAL AND LEARNED COMPONENT STRUCTURES

(75) Inventors: James Neal Richter, Belgrade, MT (US); Christopher M. Tarabochia, Bozeman, MT (US); Douglas K Warner, Bozeman, MT (US)

(73) Assignee: Oracle International Corporation, Redwood Shores, CA (US)

( * ) Notice: Subject to any disclaimer, the term of this patent is extended or adjusted under 35 U.S.C. 154(b) by 322 days.

(21) Appl. No.: 11/615,629

(22) Filed: Dec. 22, 2006

(65) Prior Publication Data
US 2007/0150455 A1 Jun. 28, 2007

Related U.S. Application Data

(60) Provisional application No. 60/753,239, filed on Dec. 22, 2005.

(51) Int. Cl.
*G06F 7/00* (2006.01)
*G06F 17/30* (2006.01)

(52) U.S. Cl.
USPC .......................................... 707/722; 707/726

(58) Field of Classification Search
USPC ................................................ 707/722, 726
See application file for complete search history.

(56) References Cited

U.S. PATENT DOCUMENTS

| | | | |
|---|---|---|---|
| 6,434,550 B1 | 8/2002 | Warner et al. | |
| 6,601,075 B1 * | 7/2003 | Huang et al. | 707/104.1 |
| 6,665,655 B1 | 12/2003 | Warner et al. | |
| 6,842,748 B1 | 1/2005 | Warner et al. | |
| 7,565,363 B2 * | 7/2009 | Anwar | 1/1 |
| 7,814,102 B2 * | 10/2010 | Miller | 707/736 |
| 2005/0086260 A1 * | 4/2005 | Canright et al. | 707/104.1 |
| 2006/0155693 A1 * | 7/2006 | Chowdhury et al. | 707/4 |

* cited by examiner

*Primary Examiner* — Mariela Reyes
(74) *Attorney, Agent, or Firm* — Kilpatrick Townsend & Stockton LLP

(57) ABSTRACT

An apparatus and method for a recursive document network searching system comprising a searchable document database containing multiple root and sub-root documents containing relational links to other documents where the relational links are manually created or are created by way learned functional components. An inventive aspect of this work is the ability to co-mingle the manual and learned components of such structures so that the user can have an efficient system for and method of a convenient and economical retrieval of the one desired informational item in an informational retrieval system that allows leveraging of the time and effort invested during prior information retrieval sessions; and can have an efficient system and method for a dynamic and context sensitive mapping of help items in a help information retrieval system. The documents at any point in the network can contain relational links to other documents both for the purposes of constructing a network. This network can be cyclic or acyclic.

26 Claims, 10 Drawing Sheets

Use case diagram. Note that any document could be a root document, but the first document must be a root document. The nodes labelled "Increase Document Connection Strength" may create a connection if none previously existed. The dashed indicator for the document connection strength shows an increase in strength for all previously viewed documents. Documents may come either from manual or learned links.

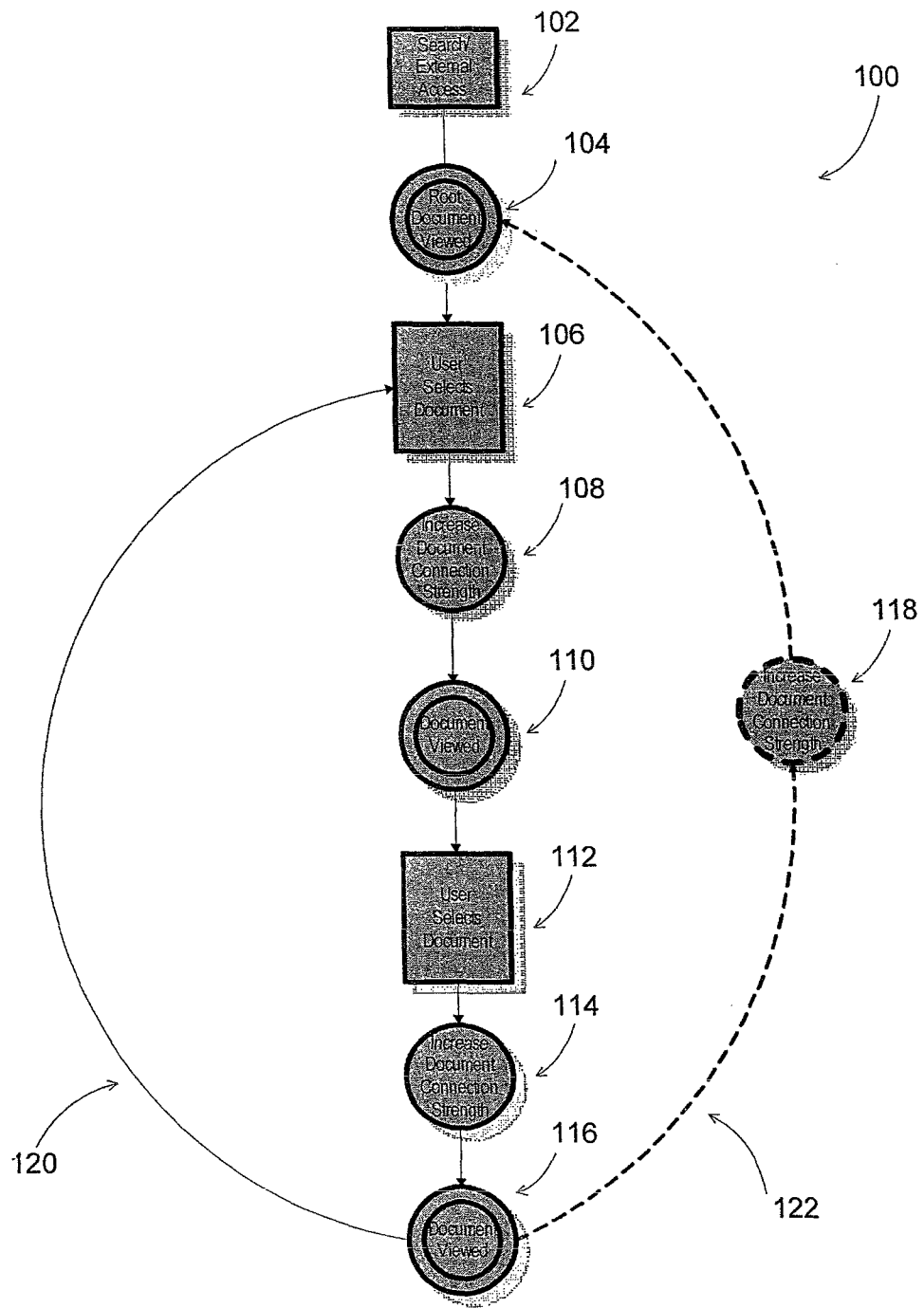

Figure 1 - Use case diagram. Note that any document could be a root document, but the first document must be a root document. The nodes labelled "Increase Document Connection Strength" may create a connection if none previously existed. The dashed indicator for the document connection strength shows an increase in strength for all previously viewed documents. Documents may come either from manual or learned links.

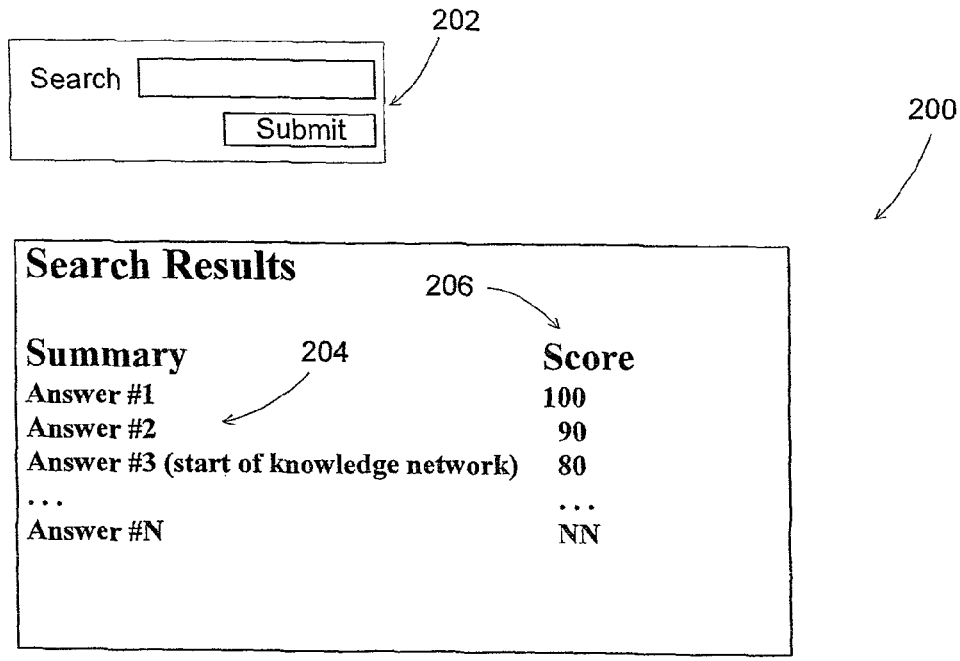

Figure 2 – User Interface. Displayed Answers are all root documents, while Answer #3 also contains manual links to other documents.

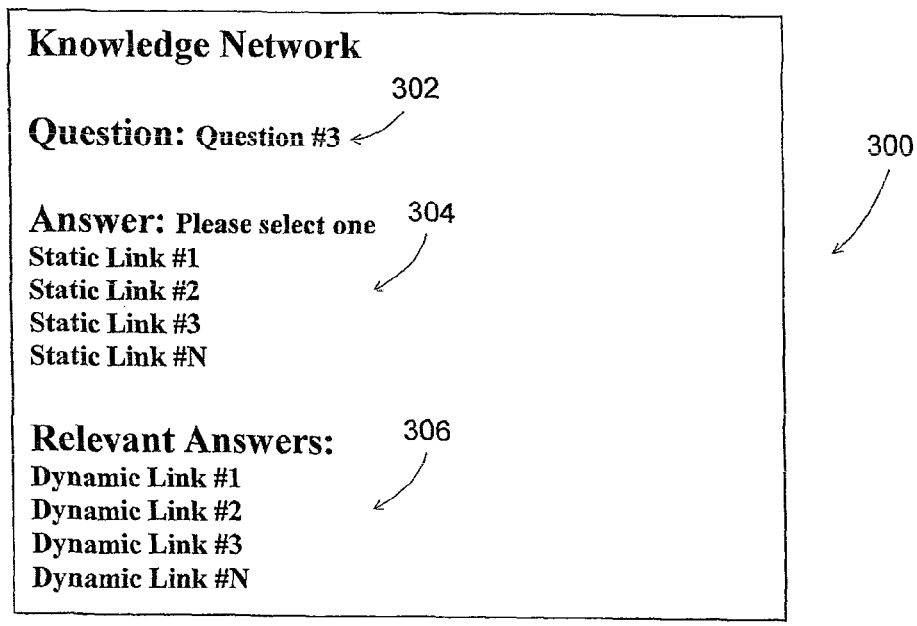

Figure 3 – Viewing a document. This could be the knowledge network document (Answer #3) from Figure 2. Static and Dynamic links all go to sub-documents, while some sub-documents could be (but are not required to be) root documents. Every document indicated by a Dynamic Link is a learned short-cut.

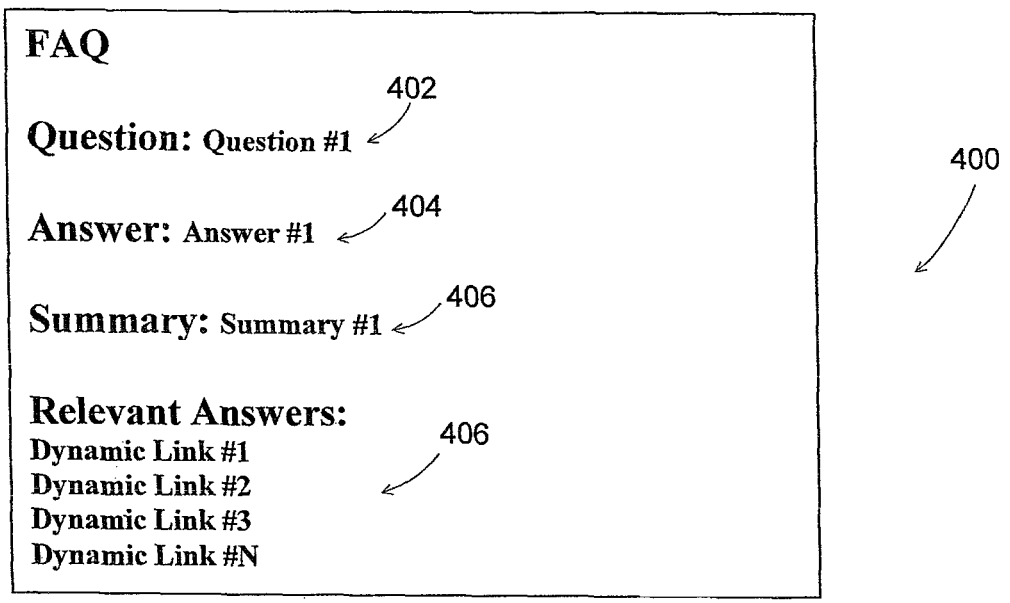
Figure 4 - Leaf Document (defined as such because there are no static links). Even though a document contains no static links it may contain short-cuts to other documents. These short-cuts are likely (but not restricted to be) all to root documents.

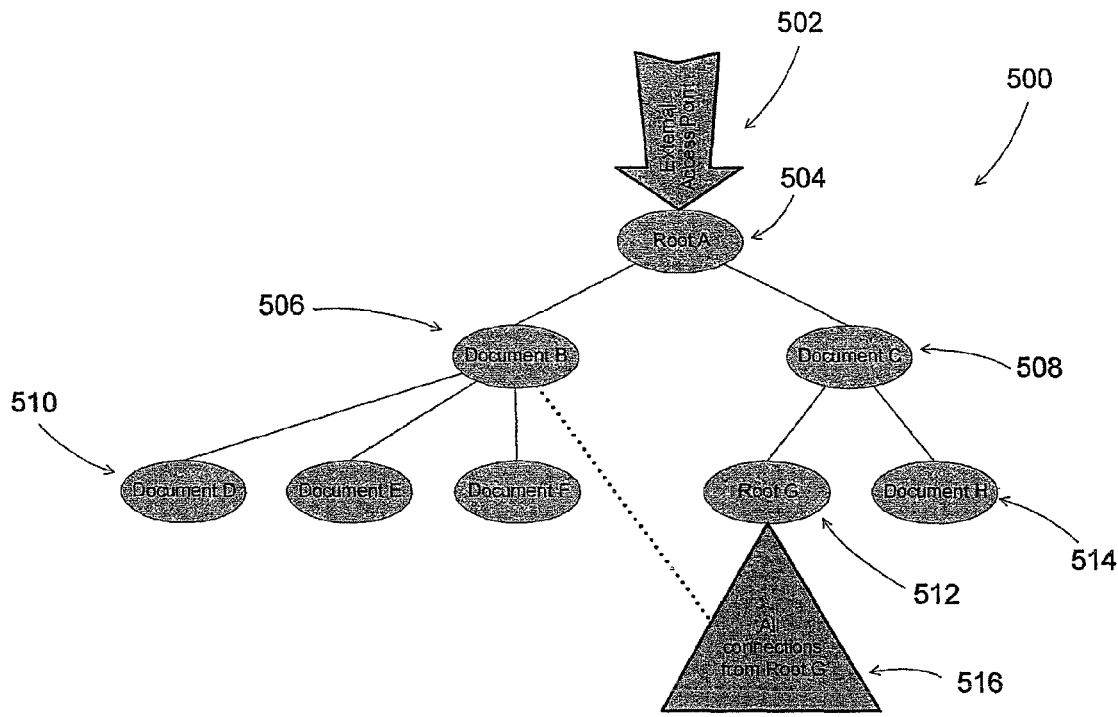

Figure 5-Example network of documents, displayed as a tree. Note the distinction between a document and a root document. The dotted line indicates a connection described in more detail in figure 6.

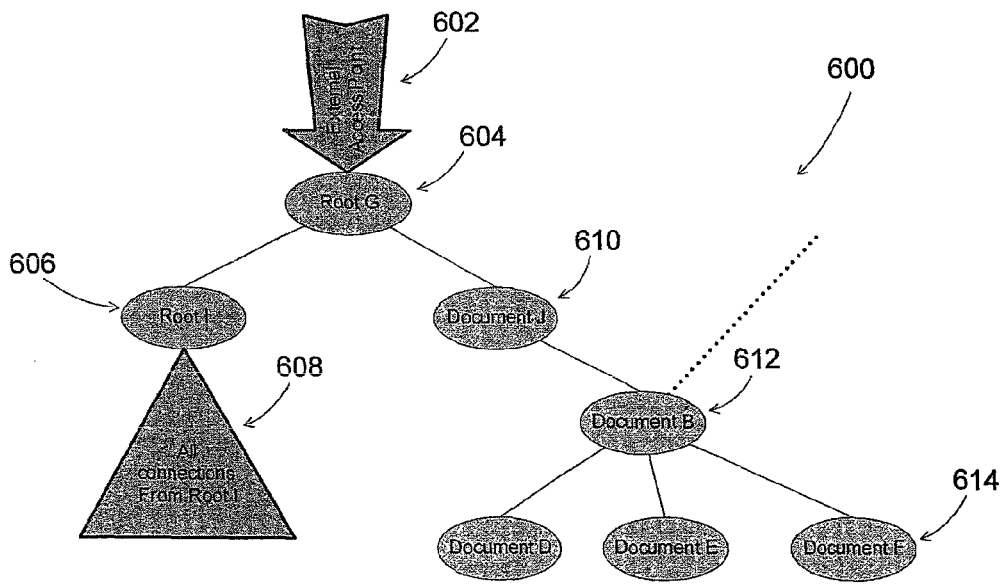

Figure 6-Example network of documents, displayed as a tree. This is the same network as in figure 5, shown from a different perspective. The dotted line indicates the connection that is explicit in figure 5 between Root A and Document B. Also note the variety of number of connections from each document, indicating no restrictions.

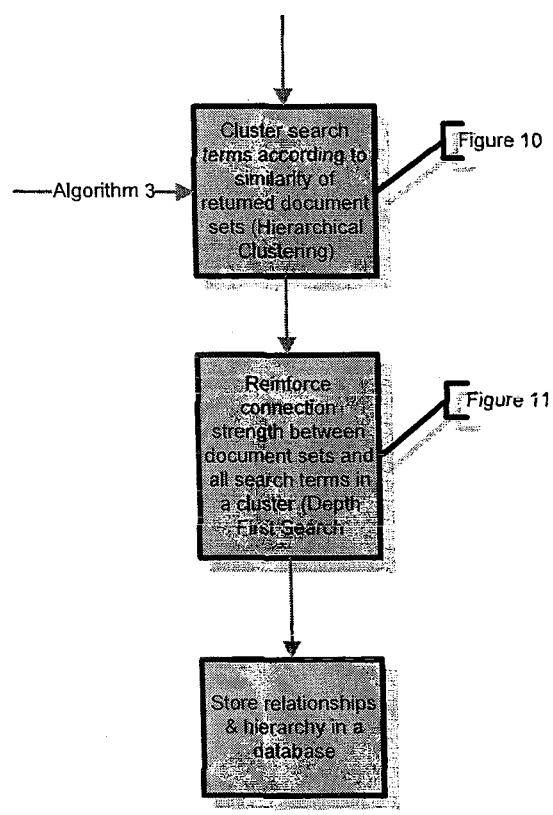
Figure 7: Learning Taxonomies or Learning New Document Structures

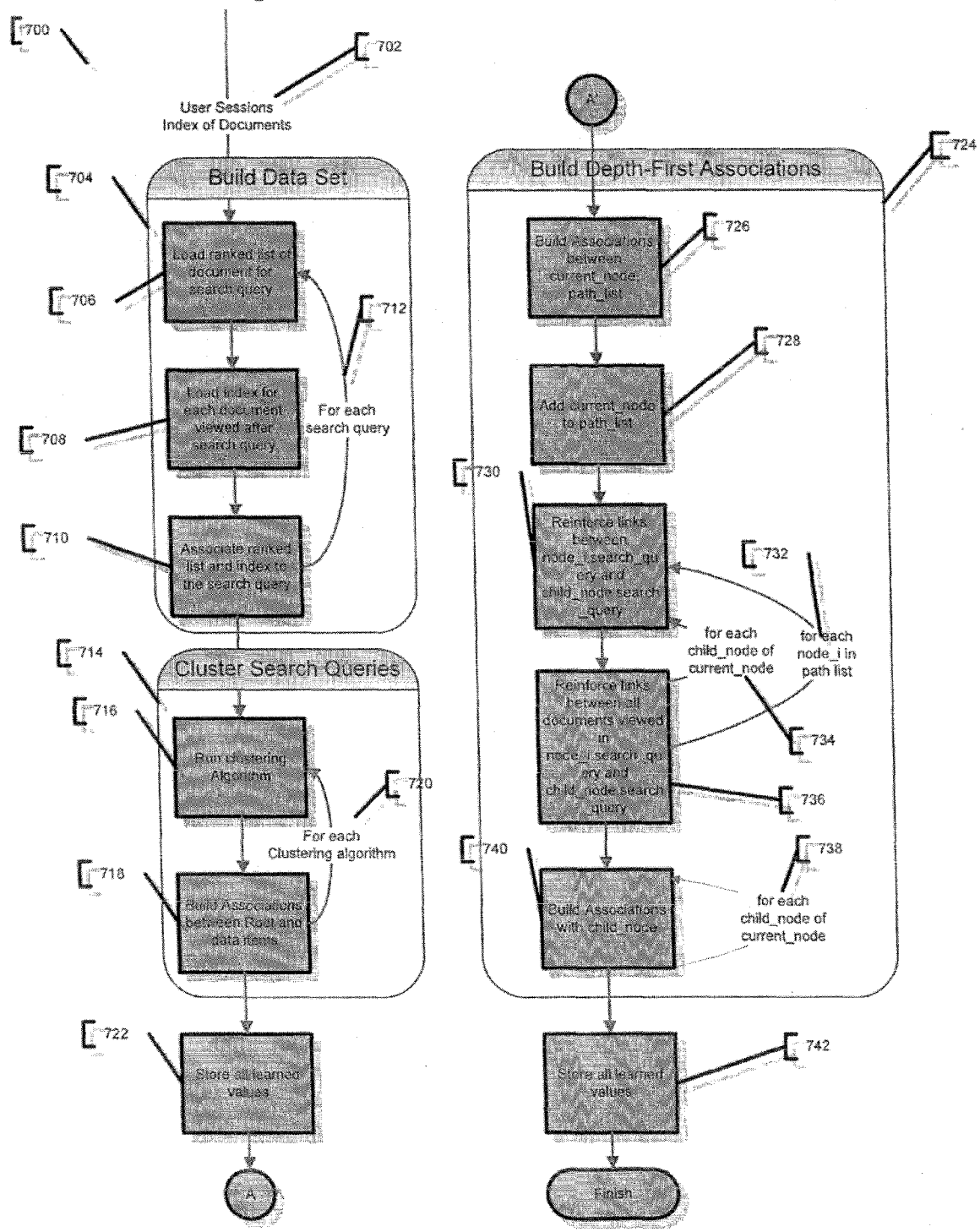

Figure 8: Searching Reinforcement Example
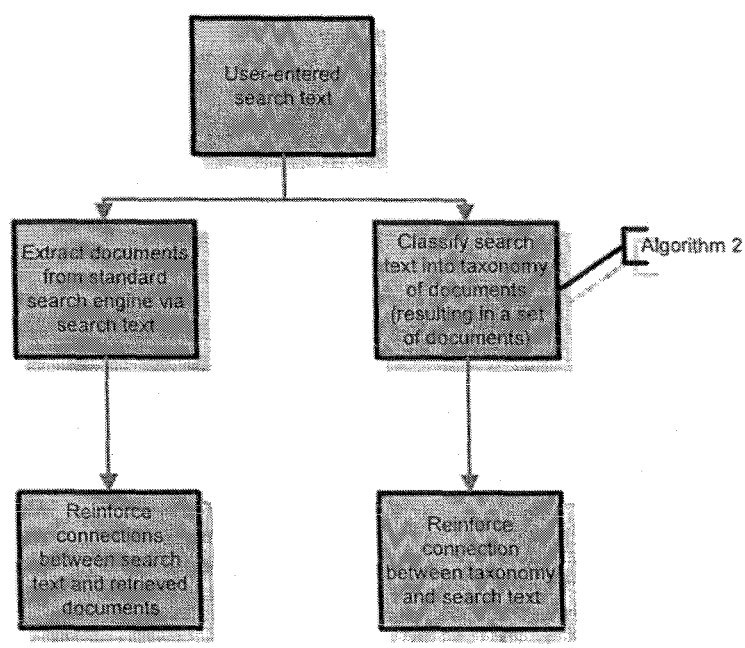

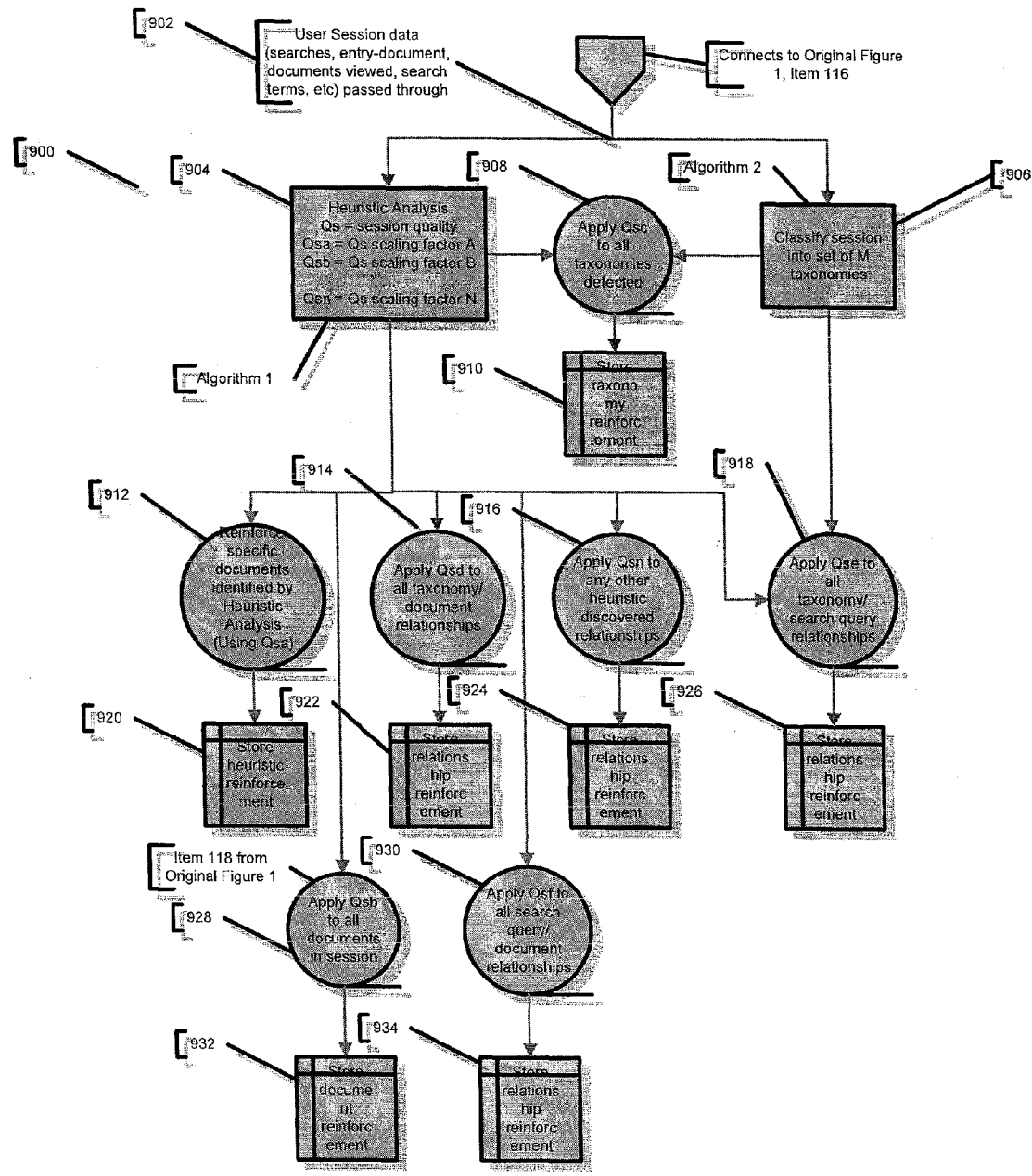
Figure 9: Session Analysis and Reinforcement

Figure 10: Search Term "Document" Tree
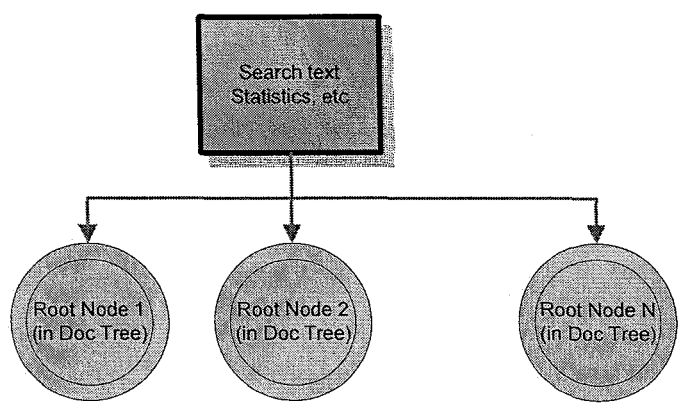

Figure 11: Tree of search terms produced by clustering algorithm
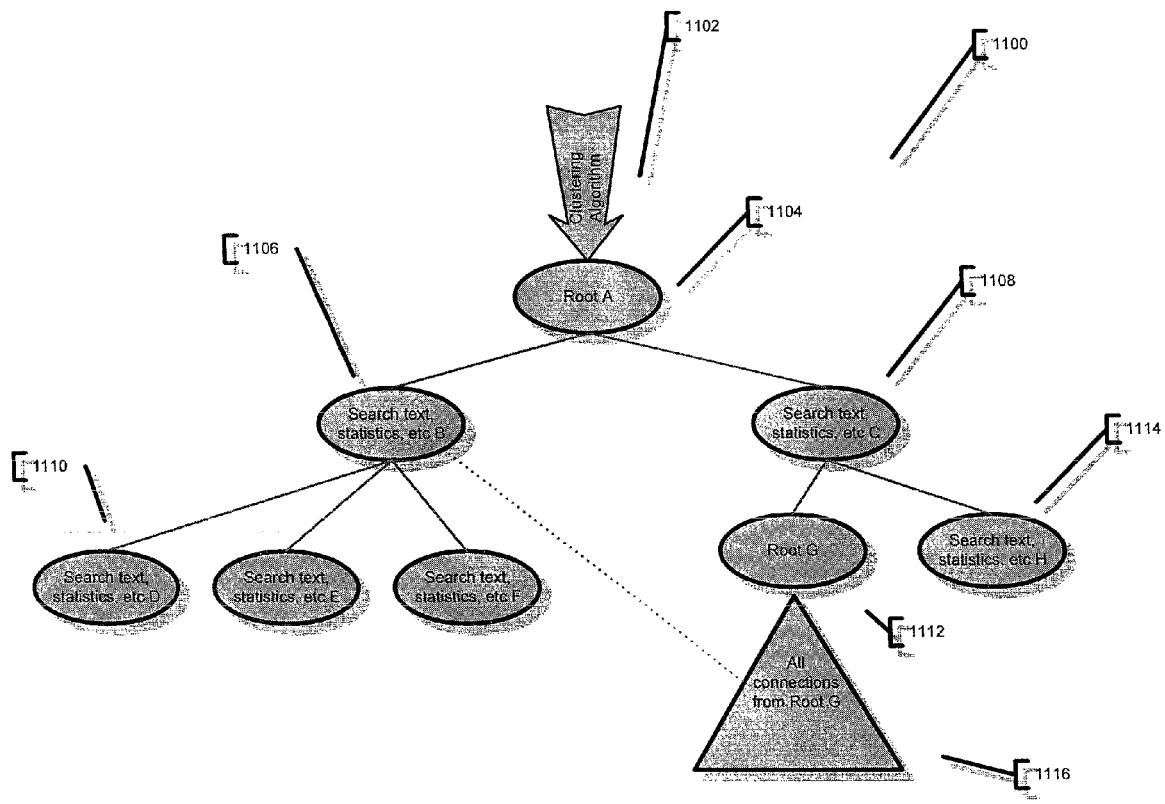

US 8,583,628 B2

RECURSIVE DOCUMENT NETWORK SEARCHING SYSTEM HAVING MANUAL AND LEARNED COMPONENT STRUCTURES

CROSS REFERENCE TO RELATED APPLICATIONS

This application claims the benefits of and priority to U.S. Provisional Patent Application 60/753,239 entitled "Recursive Document Network Searching System Having Manual and Learned Component Structures" filed on Dec. 22, 2005, which is hereby incorporated by reference to the extent permitted by law.

STATEMENT REGARDING FEDERALLY SPONSORED RESEARCH AND DEVELOPMENT

None.

BACKGROUND OF THE INVENTION

Various types of document searching systems permit users to locate documents and other informational items in a wide range of information repositories and databases. These informational items can be generally referred to as documents and vice versa. A document can contain a wide variety of content. On one end of the spectrum, a document may just contain static text, however, on the other end of the spectrum, a document may include survey information or an application. Documents may also contain networks or relational links to other documents.

By way of example, the internet, or the world wide web (WWW) may be considered as a very large database of information items, in the form of web pages, distributed over a very wide area network (WAN). Currently available search engines, can maintain a relational index of the entire content of the WWW, or a portion thereof, parsed into searchable words and corresponding locations such as for example the Uniform Resource Locators (URL).

One of skill in the art will appreciate that a database is useful when a desired information item or document can be efficiently found and retrieved from a database responsive to an inquiry. To locate and retrieve a desired information item in an information database, a search inquiry of the database, e.g., based on a keyword or a text string, may be required. The search typically involves finding entries matching the keyword (or string) in an index created from parsing the information items into searchable words and the location in which the word appears in the database or specific information item.

By way of example, a customer support technical call center may equip their customer service representative with a database system where the representative can access informational items (documents) that will assist the representative to better answer a customer's question or troubleshoot a problem that the customer is experiencing. The customer service representative may search the database in real time during a customer service call.

Another drawback of conventional help information retrieval systems is that path to locate/retriever help information items is often fixedly mapped, requiring a user to always following the same help menu path to arrive at a particular help item of interest. The problem with fixedly mapping paths is that even if the path is ultimately proven to be inefficient, the inefficient path nevertheless must always be followed in order to retrieve that particular help item. The efficiency of a particular path to be taken may depend on the context in which the help item is sought. Because the fixed mapping cannot account for the various contexts, it is inefficient, and thus diminishes the usefulness of the help information retrieval system.

A shortcoming of conventional information retrieval systems is that when using these systems, it may take some time to drill down through a database of information items to locate a particular document that will ultimately be useful in assisting a customer, and even after finding the sought after information once, to find the same information again for a later similar customer, unless the customer service representative remembers the location of the information, the representative may have to follow the same navigational trail, again spending the same required time and effort as previously expended. Moreover, a subsequent user looking for the same information would have to duplicate the time and effort, i.e., must re-invent-the-wheel, in order to find the information, and often ends an information retrieval session in frustration without finding the desired information. This duplicated effort is wasteful and inconvenient, and thus diminishes the usefulness of the database.

Thus, what is needed is an efficient system for and method of a convenient and economical retrieval of the one desired informational item in an informational retrieval system that allows leveraging of the time and effort invested during prior information retrieval sessions.

Accordingly, it is desirable to provide an efficient system and method for a dynamic and context sensitive mapping of help items in a help information retrieval system.

BRIEF SUMMARY OF THE INVENTION

The foregoing needs are met, to a great extent, by the present invention, wherein in one aspect a method is provided that in some embodiments will allow for the leveraging of previously invested time and effort during an information retrieval session.

According to one aspect of the present invention a method for retrieving information from a database of relationally linked documents is provided. The method includes the steps of receiving search parameters from a user, locating an entry point document that is responsive to the search parameters, returning a search result including the entry point document and one or more relational links between the entry point document and one or more related documents, initiating one of the relational links in response to a user link selection, displaying the document that corresponds to the initiated relational link, assigning a connection strength rating to the initiated relational link, associating the initiated relational link with the search parameters, and displaying additional documents and recursively associating initiated relational links with the search parameters.

According to yet another aspect of the present invention, a computer readable storage medium having executable program code is stored thereon for implementing a method for retrieving information items and when the program code is executed, it is operable to perform the method. The method includes the steps of receiving a search inquiry from a user, locating one or more root information items responsive to the search inquiry, returning search results comprising a list of the one of more root information items responsive to the search inquiry, displaying a selected information item having one or more relational links to related information items in response to a user link selection, displaying one of the root information items in response to a user selection wherein the displayed root information item includes one or more relational links to related information items. Additionally the steps of associating the user search parameters with the displayed root information item, classifying the user search inquiry into a hierarchy of information items, and associating the hierarchy of information items with the user search inquiry are provided.

The invention includes a recursive document network searching system comprising a searchable document database containing multiple root and sub-root documents containing relational links to each other, where the relational links are manually created or are created by way of learned functional components.

According to one aspect of the present invention is the ability to co-mingle the manual and learned network link components of such structures so that the user can have an efficient system for and method for a convenient and economical retrieval of the one desired informational item contained in an information retrieval system that can be embodied as a searchable database of document networks. An advantage provided by an embodiment of the present invention is that the present inventive method allows leveraging of the time and effort invested during prior information retrieval sessions; and can have an efficient system and method for a dynamic and context sensitive mapping of system.

The documents at any point in the network can contain relational links to other documents for the purpose of constructing a network. This network can be cyclic or acyclic. One aspect of the present invention and method provides a document decision network with multiple entry points to a root document, which can more generally be referred to as an entry point element. The document decision network can have an additional learning component to discover shortcuts from one branch of the network to another.

Documents may contain a wide variety of content. Most simply, a document can contain static text. This type of document would most commonly be used for a terminal condition in a tree or network, which can be described as a document that is linked to, but contains no manual links from it to other documents. Documents may also contain survey information or other applications. These documents can be (but not necessarily) end-points within a tree or network. For example, Trees, or sequences of directional knowledge can be viewed and branches followed to leaves. Leaves can be the end-point of an informational path. Such trees can be acyclic.

For example, when a document contains an application, the application can be a tool to scan the user's system to gather information to make a further decision, this document (with embedded application) would have links emerging from it. Similarly, it is possible that an intermediate point in the network could be a survey, which controls the direction of branching to the subsequent portions of the network—which may include additional surveys.

Documents may have a configurable indicator to specify whether they can appear (and can be searched) as an entry-point element for example, which is described above as a root document or only available as a direct link from another document, which can generally be referred to as a sub-root document. If it can be accessed as an initial entry-point to the search inquiry, it can be referred to as a root document for the purposes of this application. This indicator can be independent of the type of document and its content or attributes. In other words, a static text document may be accessed either as a root or only via a link within another document depending on the configurable indicator. Similarly, a document with manual links may be accessed either directly as a root or only from a manual link from another document.

The type of link that is used to connect documents may also influence the language used in this document. When a document is manually linked to from another document, it can be generally referred to as a sub-document or a sub-linked document or simply linked documents for the purpose of this application. No limitation is implied by the term sub-documents, it should be clear that a sub-document could also be a root document. A sub-document that is not a root document can be more specifically referred to as a sub-root document because it can not be directly linked to as an entry point element. Finally, if the document is accessible via a learned link, it can generally be referred to as a short-cut document or a learned linked document in this text. Learned links may connect any types of documents from any of the classifications, above.

The present invention describes a network of documents and is not limited to a tree, thus the 'depth' of a document in the structure is arbitrary. Similarly, a root document for the present invention is not the same as a root document when discussing a contain the same ad infinitum. This recursive structure allows for an intermingling of root and sub-documents at various points within the network.

Documents and their links can be initially manually created. However, once the manual structure is in place, automated learning techniques can be applied to both the documents and the network structure to identify patterns not explicitly represented in the manually created structure. One aspect of automated learning within this structure is based upon the links between documents. Links may have explicit or implicit ratings attached which are created and reinforced by user behavior, and/or enhanced by machine learning algorithms, and may optionally be temporally aged. Current and pending patents own by the applicant, Right Now Technologies, are applicable by way of description. More specifically U.S. Pat. No. 6,842,748 issued Jan. 11, 2005 to Warner et al.; U.S. Pat. No. 6,665,655 issued Dec. 16, 2003 to Warner et al.; and U.S. Pat. No. 6,434,550 issued Aug. 13, 2002 to Warner et al. are incorporated by reference herein in their entirety.

As discussed above, a common expectation of a document for the present invention can be a mixture of static content with explicit manually created links to other documents. Part of the inventive aspect of the present invention can be the inclusion of dynamic links from any of the above document types to other documents within the system.

Certain embodiments of the invention are outlined above in order that the detailed description thereof may be better understood, and in order that the present contributions to the art may be better appreciated. There are, of course, additional subject matter of the claims appended hereto.

In this respect, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention. Though some features of the invention may be claimed in dependency, each feature has merit when used independently.

BRIEF DESCRIPTION OF THE SEVERAL VIEWS OF THE DRAWINGS

Further features of the present invention will become apparent to those skilled in the art to which the present invention relates from reading the following description with reference to the accompanying drawings, in which:

For a better understanding of the present invention, reference may be made to the accompanying drawings in which:

FIG. 1 show flow chart illustrating steps that may be followed according to an embodiment of the inventive apparatus and method;

FIG. 2 shows a simplified illustration of a user interface showing search results according to an embodiment of the inventive apparatus and method;

FIG. 3 shows a simplified illustration of a user interface presentation of viewing a non-leaf document;

FIG. 4 is an illustration of a basic user interface presentation of viewing a leaf document;

FIG. 5 is a diagram illustrating an example of a network of documents in the present invention; and FIG. 6 is a diagram illustrating the network of FIG. 5, from a different access perspective.

FIG. 7 is a diagram illustration of an overview of the automated learning process for taxonomies;

FIG. 7a is a diagram illustration on the same topic as FIG. 7, but providing a more detailed description;

FIG. 8 is a diagram illustration of an overview of the automated learning process for reinforcing user searching;

FIG. 9 is a diagram continuing from FIG. 1 and illustrating an example user session reinforcement approach;

FIG. 10 is an illustration of a data relationship between search terms and documents; and FIG. 11 is a tree of search terms produced by clustering algorithm.

DETAILED DESCRIPTION OF THE INVENTION

The invention will now be described with reference to the drawing figures, in which like reference numerals refer to like parts throughout.

An embodiment in accordance with the present invention provides a system and method wherein in some embodiments will allow for the leveraging of previously invested time and effort during an information retrieval session.

According to the embodiment(s) of the present invention, various views are illustrated in FIGS. 1-11 and like reference numerals are being used consistently throughout to refer to like and corresponding parts of the invention for all of the various views and figures of the drawing.

According to one embodiment of the inventive apparatus and method, a system is provided comprising a recursive document network system having manually defined and learned network link component teaches a novel apparatus and method for searching a document network database.

The present invention is an information item retrieval system comprising a searchable database having stored therein content searchable documents relationally networked together by manually defined relational network link components and by learned network link components. The searchable documents can include root documents that are operable to be searched as an entry point element and sub-root documents that are searchable as links from other documents. The learned network link components can be automatically established by historical search navigation paths utilizing automated paths.

The system as described herein can perform a method for retrieving information items contained in a searchable database. The system is operable for receiving from a user a search inquiry structured with search terms and/or logic to locate documents having attributes or content that relates to the search inquiry, where the documents are located in a searchable database and configured as networks of related documents. The system can perform the step of locating an entry point root document having content or attributes that relate to the search inquiry, where said root document contains relational links to linked documents, and where said relational links include a manually defined relational network link component, or simply referred to as a manual network link, to a manual linked document in the database and a learned relational network link component, or simply referred to as a learned network link to a learned linked document in the database.

The system can further perform the step of initiating one of the relational links based on the relational link selected by a user; and launching the linked document related to the relational link selected where said linked document contains sub-relational links to sub-linked documents, said sub-relational links can comprise a second manual relational network link to a second manual linked document in the database and a second learned relational network link to a second learned linked document in the database.

The details of the invention and various embodiments can be better understood by referring to the figures of the drawing. Referring to FIG. 1, a diagram of the system's data flow 100 based on the user interaction is shown. The user can enter a documents contained in a searchable database and having attributes or content that relates to the search inquiry. The documents contained in the database can be configured as networks of related documents.

The system is further operable to locate an entry point element, more specifically referred herein as a root document as represented by functional block 104, where the root document has content or attributes that relate to the search inquiry. The root document once located can be launched on a user interface for viewing by the user. The root document as viewed by the user can contain relational links to linked documents where the relational links can include a manual relational network link component to a manual linked document in the database and a learned relational network link component to a learned linked document in the database. Once the root document is presented to the user for viewing, the user interface can be operable to allow the user to select documents by selecting one of the relational links as represented by functional block 106. Once the user makes a selection, the relational link selected is initiated.

The system is operable to capture the user's selection and begin to automatically establish an historical search navigation path which relates back to the search inquiry. When the user selection has been made, the system is operable to increase the document connection strength between the content and attributes of the search inquiry and the linked document as represented by functional block 108. Automated learning techniques can be utilized by the present invention that can be applied to both the documents and the network structure to identify patterns not explicitly represented in the manually created structure of the document network.

One aspect of automated learning within the structure is based upon the links between documents and the historical search navigation paths of the various users. The links may have explicit or implicit ratings attached which are created and reinforced by historical user behavior and/or enhanced by machine learning algorithms. The learned links that are established may optionally be temporarily aged. The document ratings can be allowed to decay over time to minimize the tendencies for historical usage biased ratings and to provide more temporally accurate ratings. The strength or rating attached to the link can be rated based on various factors. For example, the experience of the user may act as a weighting factor for the strength attributed to the link.

A second linked document can be launched and viewed based on the user selection as indicated by functional block 110. This linked document, which in this case can be referred to as a sub-root document, can also have manually defined relational network linked components and learned network linked components. As the user is viewing the document, the user interface is operable to allow the user to select one of the relational links. If necessary, the user can select a relational link as represented by functional block 112. Again, this selection by the user can increase the document connection strength and begin to establish an historical search navigation path relating to the initial search inquiry and selections made there between by the user. The increase in the document connection strength is represented by functional block 114. An adaptive path to the final knowledge item can be dynamically created. The document can again be reviewed by the user as represented by functional block 116. The linked document can again have both manual relational network link components and learned relational network link components.

Directional arrows 120 and 122 illustrate the recursive nature of the architecture of the present invention. The dashed indication of the directional line 122 indicates that the document connection strength is increased for all previously viewed documents. The documents that are launched as a result of a user selection may result from a manual or a learned link. The directional lines 120 and 122 illustrate that sub-root documents as well as root documents can be accessed as a result of a user's selection of a linked document.

Referring to FIG. 2, an illustration of a basic user interface presentation of the system is shown. The user has the ability to input and submit a search criteria construct containing certain content and attributes as indicated by user interface 202. User interface 200 illustrates a search result presentation that provides a summary of answers 204 and a score 206. The displayed answers 204 can be root documents however answer #3 can contain all manual links to other documents.

Referring to FIG. 3, an illustration of a basic user interface presentation 300 for viewing a linked document is shown. This user interface presentation reflects a knowledge network document where a question 302 is presented and manual links 304 and learned links 306 are presented. As shown by this presentation, both static links which relate to manually linked documents and dynamic links which relate to learned linked documents can be contained within the same sub-document. The static and dynamic links or the manual and learned links respectively, can be linked to sub-documents or root documents. The documents indicated as a dynamic link is a learned document also referred to as a shortcut document.

Referring to FIG. 4, an illustration of a basic user interface presentation 400 of a sub-document is shown. This sub-document presents Question #1 as indicated by identifier 402. Also provided are a static answer 404 and a static summary 406. However, no static links are provided in this document. However, the relevant answers 406 provide multiple dynamic links to other documents based on learned linked documents.

Referring to FIG. 5, a diagram illustrating an example of a network of documents 500 is shown. The external entry point 502 is shown linking to a root document operable to be searched as an entry point element 504. The root document 504 is shown directly linked to sub-documents B and C or 506 and 508, respectively. Sub-documents B and C are further linked along a navigation path to another tier of documents as indicated by 510 and 514, respectively. Sub-documents B and C can also be more specifically referred to as sub-root documents. One of the linked documents to document C is a root document G as indicated by 512. Root document G has a separate document network tree as indicated by functional block 516 which is indicative of all the connections from root G.

Referring to FIG. 6, root G is further illustrated as entry element 604 accessed through its access point 602. Root G is shown linked to root I 606, which in turn has a separate tree as represented by functional block 608 indicative of all the connections of root I. Root G is further linked to sub-document 610 which is further linked to a second tier 612 and a third tier 614.

The content, syntax, construct and scheme of a document or information item can vary based on need. Each Document can contain for example the following:
  1. Text
  2. A set of manually-created links to other Documents, each with a label.
  3. A set of learned links to other Documents, each with an optional manual label. (per U.S. Pat. No. 6,842,748 issued Jan. 11, 2005 to Warner et al. which is incorporated by reference herein in its entirety)
  4. A Boolean variable to specify if the Document is a Root document.

2-4, above, describe an arbitrary length array of references to other Documents. This makes it a container. These contained documents inherit the properties of the container document.
  Each of these references is either 'container of' or 'contained in' type.
  Each reference has a label
  Each document may optionally contain:
  Title
  Keywords
  Author/Maintainer of the document.
  A set of attributes chosen from a set of hierarchical menus that categorize the document
  A set of attributes that are assigned dynamically by a machine learning algorithm
  A learned rating of the document. A relevance rating of a selected informational item can be further adjusted based on any actions the user takes subsequent to the initial selection of the informational item if the subsequent act indicates that the relevance of the selected informational item may be less than what is reflected by the rating increase by the predetermined amount. Ratings of the informational item can be determined from implicit suggestions from the usage of the retrieval system and the database by the user rather than explicit user input. (See U.S. Pat. No. 6,665,655 issued Dec. 16, 2003 to Warner et al. which is incorporated by reference herein in its entirety.)
  Version history of changes to the document.
  A visibility attribute that can make it secret. Secrecy is defined by the set of people that can access the document. The minimum is 1, the author of the document.
  Other attributes as appropriate to describe or classify the document Root-documents are the only 'starting document' that a user sees when browsing the repository or when searching. Once a user begins interacting with the selected root-document, the user sees the sub-documents 'contained' in the root-document.

Root-documents can contain other root-documents. This would allow users to jump to specific areas within a larger document.

The system scheme can contain:

A set of documents (as described above)

A method of querying the Index to supply Root Documents that match the query based upon at least one of:

Terms & keywords in query

Attributes in query matches against hierarchical attributes of a document

Secrecy level of user issuing query

Implicit or explicit rating of documents (by users)

Machine learned value of document

A machine learning system which can do initial and ongoing populations of document and link ratings. (See U.S. Pat. No. 6,665,655 issued Dec. 16, 2003 to Warner et al. which is incorporated by reference herein in its entirety). This system can:

Create relationships between documents based upon an analysis of proximity of usage.

A method of on-line reinforcement of existing ratings

A method of rendering the documents and its contents to a computer system (preferred embodiment: via the WWW network & browser)

The system scheme can optionally contain:

An associated inverted-index of weighted terms that each document contains

A machine learning system which can do initial and ongoing populations of document and link ratings. (See U.S. patent application Ser. No. 09/751,934, filed Dec. 29, 2000 entitled "Automated Adaptive Classification System for Knowledge Networks" which is incorporated by reference herein in its entirety). This system can:

Create relationships between documents based upon document similarity

A data store containing a record of what paths a given user followed through the documents. This can generally be referred to as the historical navigation path.

A method of on-line reinforcement of ratings based upon the assigned expertise level of the user.

Additional learning techniques or modifications to the above learning techniques could also apply. Specifically, documents can often contain attributes that describe what that document contains. These attributes usually are manually assigned. These human assigned attributes could be used for learning. Similarly, the document might be analyzed to discover attributes that are not human assigned. The availability of these attributes, whether human or machine learned, further augments the network structure for presenting document relationships.

Similarly, documents may exist in a conceptual taxonomy of relationships. The term taxonomy used in this work refers to a particular grouping of documents in a hierarchical fashion. Just as with the earlier description of a tree reflecting a particular reference perspective on the data as in FIGS. 5 and 6, taxonomies as used herein also differ depending upon the initial access point and do not imply a fixed, directional hierarchy. These taxonomies can be manually created or automatically extracted from the text of the documents, as in application Ser. No. 10/226,542 filed Aug. 22, 2002 by Warner, et al., titled, "Method for Clustering Automation and Classification Techniques" which is incorporated by reference herein in its entirety. These taxonomies may be incorporated into the learning process, as in FIGS. 8 and 9.

FIGS. 7 and 7a show how taxonomies can be learned. FIG. 7a is a detailed expansion of FIG. 7, and so will be discussed in more detail here. The entire process is referred to as item 700. Item 702 indicates that the incoming data includes at least the user sessions and an index of the documents available for access. From here, item 704 is simply a grouping of process steps that all build the data set used for the later steps. These process steps include item 706, which calls the ranked list of documents and search queries into active memory. Item 708 then loads the index for each document viewed after a given search query in the user session. Finally, item 710 associates the ranked list and the index to the search query. This process loops, via item 712, for each search query in the session.

The process continues at item 714 after all search queries have been looped through. Item 714 groups the processes that cluster the search queries. Item 716 runs a clustering algorithm on all relevant data. Item 718 then builds the associations between the root and various data items as generated in the clustering algorithm, item 714. If there are multiple ensembles of clustering algorithms, item 720 loops through the various clustering algorithms. Item 722 stores all learned values relating to the building of the data set, item 704, and the clustering processes, item 714.

After storing the relevant data, the process continues at item 724, the group of processes used to build the depth-first associations. Item 726 builds the first set of associations, between the current node and the various items in the user session path list. From here, item 728 adds the current node to the path list, and continues in a recursive manner through the path. Item 730 reinforces the links between the current node search query and any child node search queries. Control passes to item 736 where the links between all documents viewed in the current node search query and the child node search query. The relationship between items 730 and 736 is a nested loop as indicated by item 734, the inner control loop for each child node of the current node, and item 732, the outer control loop for each node in the path list. Once the loops are complete, control passes to item 740, which builds the associations with each child node. This is also a loop, via item 738, that iterates across all child nodes of the current node. Once complete, control finally passes to item 742, where all the learned values are stored for future access.

One of ordinary skill in the art can readily see that certain items in the diagram 700 could be placed in different order, or left out entirely. For example, item 722 is an optional step, and its absence would not impede the algorithm or its function. While the diagram is sufficient explanation of the algorithm, the following pseudo-code is offered as additional, alternate disclosure of the same approach:

| Input: User sessions |
| --- |
| Inverted index of documents |

1. //build data set
2. For each search query in all user sessions
3. Load ranked list of document for search query
4. Load index for each document viewed after search query
5. Associate ranked list and index to the search query
6. ...
7. //cluster search queries based upon each
8. For each clustering algorithm i
9. clustered-hierachy = hierachical_clustering_algorithm_i(data set)
10. build_associations(clustered-hierachy.root( ), null)
11. ...
12. store all learned values
13. ...
14. //build depth first associations
15. build_associations(current_node, path_list)
16. add current_node to path_list -continued Input: User sessions
Inverted index of documents 17. for each node_i in path list
18. for each child_node of current_node
19. reinforce links between node_i.search_query and child_node.search_query
20. reinforce links between all documents viewed in node_i.search_query and child_node.search_query
21. ...
22. for each child_node of current_node
23. build_associations(child-node)
24. ...
25. store all learned values FIG. 8 provides an example of how the searching reinforcement may occur. Starting with the user-entered search text, separate parallel paths emerge: one working within the standard search result list, the other working with a taxonomy of results. Within the standard results, the reinforcement occurs by relating the selected documents with the given search query, allowing the future uses of that search query to retrieve a different ranking of documents. Within the taxonomy path, the search query is classified into the taxonomy to find its representative position, resulting in a list of matching documents in the taxonomy, which then strengthens the connection between the taxonomy and the search text.

FIG. 9, represented in its entirety by item 900, describes a process for session analysis and reinforcement. Of note, FIG. 9 can be conceived as continuing from FIG. 1, item 116. Item 902 indicates that the relevant data passed in to the algorithm includes, at least, the full user session data, such as the searches, the entry-document, the final document, all intervening documents, stemmed and unstemmed search terms, time spent per document, and any other representative information that would be obvious to one of ordinary skill in the art. Control moves primarily to item 904 where a heuristic analysis is performed on the user session data. The results of the heuristic analysis include a large variety of scaling factors based off of the session quality. Control moves secondarily to item 906, where the session is classified into a set of taxonomies.

Resulting from the heuristic analysis, item 904, are numerous paths to reinforcement of the user sessions. The reinforcement might apply to item 912, specific documents identified by the heuristics, item 914, the taxonomy/document relationships, item 928, all the documents in the session, item 930, the search query/document relationships, or item 916, any other heuristic discovered relationship that would be apparent to one of ordinary skill in the art. Similarly, the combination of items 904 and 906 would result in item 908, the reinforcement of detected taxonomies, and item 918, the reinforcement of the taxonomy/search query relationships. Again, other combined relationships as apparent to one of ordinary skill in the art are similarly covered by this representation, even if not explicitly represented in the FIG., 900. Finally, as represented by items 910, 920, 922, 924, 926, 932, and 934, the results of the reinforcements are stored for later access and use.

One of ordinary skill in the art can readily see that certain items in the diagram 900 could be placed in different order, or left out entirely. For example, item 912 is an optional step, and its absence would not impede the algorithm or its function. While the diagram is sufficient explanation of the algorithm, the following pseudo-code is offered as additional, alternate disclosure of the same approach:

Input: User Session (searches, entry-document, documents-viewed)
Heuristic Session Scoring Rules 1. //Heuristic Analysis
2. //Apply_Heuristic_Session_Scoring_Rules( ) function returns a number
3. //from 0-1000 denoting the quality/value of a particular session
4. Qs = Apply_Heuristic_Session_Scoring_Rules(User-Session)
5. n = number of documents viewed in user-session
6. ...
7. //Entry Document Reinforcement
8. Add Qs to entry Document internal score
9. ..
10. //Search Text Reinforcement
11. For each SearchQuery in user session //index i
12. Add Qs to each SearchQuery[i] internal score
13. ...
14. //Viewed Document Reinforcement
15. Qsn = Qs/n
16. For each document viewed in user session //index i
17. Add Qsn to Document[i] internal score
18. ...
19. //Topic Taxonomy Classification
20. Classify session into Topic Taxonomy Network
21. m = number of Topics matched //index i
22. Qsm = Qs/m
23. For each matched topic
24. Add Qsm to Topic[i] internal score
25. ...
26. //Topics to Documents reinforcement
27. For each Matched Topic //index i
28. For each Document viewed in session //index j
29. Add Qs to Topic2Document[i,j] internal score
30. For each SearchQuery in session //index k
31. Add Qs to Topic2SearchQuery[i,k]
32. ...
33. //Search Query to Documents reinforcement
34. For each SearchQuery //index i
35. For each Document viewed in session //index j
36. Add Qs to SearchQuery2Document[i,j] internal score
37. ...
38. ...
39. Store all updated internal scores FIG. 10 briefly shows now the search text, statistics, taxonomies, or the like can be represented abstractly as part of a document tree. For example, the search text could directly be connected by data structures, such as linked lists or the like, to a suite of root nodes in the traditional document tree. One of ordinary skill in the art can easily see how this general approach may apply to the other related data, such as statistics, taxonomies, or the like, used throughout this work.

FIG. 11 expands on the concept presented in FIG. 10. Analogous to FIGS. 5 and 6, FIG. 11 shows how search text, statistics, and the like can manifest similarly to the document structures. In fact, search text, statistics and the like could be properties on an abstract data structure that also has properties to represent a document. Depending upon which properties are available at a given point would be all that is necessary to differentiate between a document structure, as in FIG. 5, or search terms and clustering results, as in FIG. 11. Note that the numbering in FIG. 11 corresponds to the 500 series of numbers in FIG. 5 in that external entry point 1102 is similar to external entry point 502. Accordingly, numbers 1102-1116 designate functional components similar to 502-516.

Finally, descriptions in the FIGs. referring to algorithm 1, algorithm 2, and algorithm 3, should be clear from the FIGs. However, the following pseudo-code is offered as additional, alternate disclosure of the various labeled algorithms:

Algorithm 1: Compute Qsession according to heuristic rules given by knowledge administrator.
Algorithm 2: Suite (ensemble) of classification algorithms.

Algorithm 3: Suite (ensemble) of clustering algorithms, using a metric including both document similarity and search similarity.

Other learning techniques abstracted from the document structure may also apply, including relating search queries to documents (see FIGS. 7, 7a, 9, 10, and 11), search queries to taxonomies (FIGS. 7, 7a, 8, 9, 10, and 11), taxonomies to documents (FIG. 9), or any other heuristic technique that one of ordinary skill in the art may determine as useful (FIG. 9). To simplify implementation, the variety of items that can be learned and related could be conceived of as an abstract document containing the desired content of search term, taxonomy, or the like, but lacking other elements of a traditional document, as described above, such as Title, or Keywords.

Herein the term "document" may be taken interchangeably to mean either the traditional description or this abstract document. Similarly, this generalized use of the term "document" could also apply to those techniques described in the referenced patents, for example, with data aging (included by reference: U.S. Pat. No. 6,434,550) the aging could apply to traditional documents, but also search queries, topic taxonomies, topic/document relationships, search query/document relationships, search query/topic relationships, or any other similar document-type element where usage ratings may be stored.

Reinforcement and learning of the document network links can be done either in a general way, or with some specific goal in mind. If the users of the document network are identified as either expert or novice, for example, this identification can bias the construction and maintenance of the learned portion of the network. The expert/novice distinction could be used to track and present information individuals in each category distinctly, or it could be used in some algorithmic combination, such as having the expert level reinforcement strength is some integer multiplier above the reinforcement strength of a novice. Other user classifications could be used similarly (such as product ownership, etc).

Additional automated learning techniques can be applied to either the manual or learned structure of the document network. For example, the network structure could be run through an algorithm to discover specific patterns of linkages, or cliques, which could be extracted and presented as an aid to the construction of new documents, or provide alternate paths to the user for the learned relevant documents portion. Similarly, these network structures could be reduced with a rule learning algorithm and the rules could be used for alternate purposes.

The construct of the present invention allows knowledge administrators to build varied informational knowledgebases that contain arbitrary structure within and between documents. The construct also reduces the amount of time searching for a specific knowledge node. By leveraging the interactions of the artificial intelligence (AI) and the static branching it will allow a person to either quickly identify the next path or the final knowledge item. The person can then leverage the static branching when beginning to understand the area of knowledge or allow the person to simply shortcut the decision making process by providing relevant knowledge items for dynamic branching.

This construct uses AI and prior knowledge interaction to allow for an adaptive pathing of knowledge items. By using AI it is possible to automatically drive more relevant knowledge items to a position of closer proximity based on the usage of that knowledge item. As the knowledgebase is used over time in conjunction with the knowledge network, more relevant knowledge will be in closer proximity to different points on the knowledge network.

The user interface can be further described by utilizing the following examples by way of illustration.

EXAMPLE 1

Troubleshooting Wizards

Authors can build Wizards that exist as a document but contain other documents. The end-user can navigate to the document by moving between sub-documents, each of which is assigned a label. The user 'branches' to other documents when choosing and following a label. Users interacting with the Wizard can use it to both search for information and to navigate through a manually defined network of Documents. Through explicit and implicit human usage, and potentially other machine learning algorithms, the attributes described above allow the network to learn, or adapt, to its usage, which makes it an adaptive knowledge network.

Rather than enforcing a strict, manually constructed path through the document structures, the concept of the adaptive knowledge network provides a mechanism to allow the user to short-cut the decision making process by providing relevant knowledge items earlier in the troubleshooting process. Thus, by leveraging the interactions of skilled agents and other consumers with the documents, the knowledge network can assist with short cutting the branching process by providing the most relevant information more quickly. This can generally be referred to as dynamic adaptive pathing. This blending of static branching and dynamic AI interaction allows for more robust and quicker knowledge access by users with different levels of skills.

EXAMPLE 2

Call Scripting

In the scenario of a large call center that is spread across different time zones and having varied agent skills, this example illustrates the method of using the knowledge network.

A new agent receiving a call, uses their computer to bring up the search engine for the knowledgebase. Upon an initial search the starting node of the knowledge network is presented as the first item in the search results. The starting point is flagged as "Consumer Products Wizard." The agent clicks on this document item and then is given the choices of the next node by way of static decision listing or relevant document listing.

The choices available to the agent could conceptually include:
 Need help with DSL
 Need help with Cell Phone
 Need help with Long-Distance
 Need help with Email The agent selects "Need help with Email" as the topic most closely matching the issue they need to resolve. The web browser returns with the document "Need help with Email" containing the following static decisions:
 I am using Outlook
 I am using Outlook Express
 I am using Mozilla The following adaptive decisions (learned from the human interactions or other machine algorithms, and titled "relevant links" in subsequent examples)
 Problems with Outlook and SMTP mail
 How do I find my email password
 Unable to find host server with Outlook The agent at this point can continue down the static decision path by following one of the "I am using" links, or they can short-cut the method by selecting a relevant adaptive decision knowledge item created by dynamic adaptive pathing. For this example, the agent selects "Problems with Outlook and SMTP mail" because the consumer on the phone has identified an SMTP error message. Due to providing relevant adaptive documents to the agent in real time, the agent has shortened the call time because they are able to document the question more quickly based on an adaptive decision method.

EXAMPLE 3

Self-Service

When a user submits a question (via email or web software), the question can be analyzed via a standard search approach (perhaps by using information retrieval with inverted index and querying method) and the attributes the user identified about themselves and/or the question.

The system would then return the most relevant documents with the provided information. As described above, these results could include more than just "flat" documents. They allow the user the ability to forage, within a single provided document, for directed and identified information that is relevant and contains structure, such as manually created or learned links to other documents.

EXAMPLE 4

Including user Surveys and Applications During the Self-Service Activity

A user visits a customer support site. Through the course of the searching or browsing actions, they encounter a knowledge network document on their topic of interest. The selections could be as follows:
Problems with Email:
I don't remember my password
I don't remember my account name
I am having trouble getting connected
Relevant Links:
I need to set up an email account
The user selects "I am having trouble getting connected" and is prompted with:
Connection Problems:
Troubleshoot my computer
Troubleshoot my router
Relevant Links:
How to reset your router
The user selects "Troubleshoot my computer" and is prompted with:
Please wait while a troubleshooting application runs on your computer . . . Done.
The troubleshooting application has discovered an obsolete version of the email client. Please download the latest email client to correct your problem.
This solved my problem
This solved part of my problem but I still have router problems
Relevant links:
Download the latest versions of our web browser
The user selects "This solved my problem" and is prompted with:
Please take our customer satisfaction survey:
1. How useful was our troubleshooting system?
a. not at all
b. somewhat
c. very
2. How happy are you with our product?
a. not at all
b. somewhat
c. very
3. Are you likely to continue with our service?
a. yes
b. no
c. don't know
Relevant Links:
How do I contact customer support?
Where do I go to buy the latest gadget?

The various recursive document network system examples and embodiments shown and describe above illustrate a novel document search system that is recursive and includes both manual and learned components. A user of the present invention may choose any of the above embodiments, or an equivalent thereof, depending upon the desired application. In this regard, it is recognized that various forms of the subject document network system could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

According to one embodiment of the present invention, the method is implemented as a computer program, namely, as a set of instructions executed by a processor. Thus, for example, the method may be a cross-platform java application, a standalone application written in native code, a distinct process built into a server, or part of an application server accessible via thin client or web browser functionality. One of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

Other aspects, objects and advantages of the present invention can be obtained from a study of the drawings, the disclosure and the appended claims.

What is claimed is:

1. A method for retrieving information from a database of manual and learned relationally linked documents, the method comprising:
receiving, by a computer system, search parameters from a user;
locating, by the computer system, an entry point document responsive to said search parameters, the entry point document comprising a root document in a hierarchy of a plurality of related documents;

returning, by the computer system, a search result including said entry point document and one or more manual relational links and one or more learned relational links between said entry point document and one or more related documents in the plurality of related documents, wherein the manual relational links comprise relational links between documents within the hierarchy manually encoded in the documents and wherein the learned relational links comprise dynamic links between documents within the hierarchy that are not manually encoded in the documents, that are not known at a time of creation of the documents, and that are generated automatically based on text of the documents;

initiating, by the computer system, one of said learned relational links in response to at least one user link selection;

returning, by the computer system, the document from the plurality of related documents that corresponds to said learned initiated relational link;

updating, by the computer system, a connection strength rating to said learned initiated relational link based on the user link selection and indicating navigation of the user through the hierarchy;

associating, by the computer system, said learned initiated relational link with said search parameters;

storing, by the computer system, in said database said learned relationally linked documents, said updated connection strength and said learned initiated relational link with said parameters;

returning, by the computer system, additional documents from the plurality of related documents; and recursively associating initiated relational links with said search parameters, wherein at least one of said returning steps include using a clustering algorithm on the hierarchy of the plurality of related documents.

2. The method according to claim 1 wherein assigning a connection strength rating further comprises adjusting said connection strength rating according to the skill level of said user.

3. The method according to claim 1 wherein a connection strength rating is assigned to each of said initiated relational links.

4. The method according to claim 1 further comprising:
displaying, by the computer system, subsequent documents from the plurality of hierarchically related documents in response to subsequently initiated relational links; and
recursively assigning, by the computer system, a connection strength rating to all relational links selected by said user.

5. The method according to claim 1 further comprising assigning, by the computer system, a path rating to the first and last of said initiated relational links.

6. The method according to claim 1 further comprising assigning, by the computer system, a path rating to all of said initiated relational links.

7. The method according to claim 1 further comprising periodically adjusting, by the computer system, the path rating based on age.

8. The method of claim 1 wherein said search parameters may be absent or alternatively may return all said documents in said database of relationally linked documents.

9. The method of claim 1, further comprising classifying the search parameters into a taxonomy and wherein the hierarchy of the plurality of related documents dynamically represents the taxonomy based on the entry point document.

10. The method of claim 9, wherein updating the connection strength rating to said learned initiated relational link comprises updating the relational link between documents within the taxonomy.

11. A system comprising:
a processor; and
a memory coupled with and readable by the processor and having stored therein a set of instructions which, when executed by the processor, causes the processor to retrieve information from a database of relationally linked documents by:
receiving search parameters from a user;
locating an entry point document responsive to said search parameters, the entry point document comprising a root document in a hierarchy of a plurality of related documents;
returning a search result including said entry point document and one or more manual relational links and one or more learned relational links between said entry point document and one or more related documents in the plurality of related documents, wherein the manual relational links comprise relational links between documents within the hierarchy manually encoded in the documents and wherein the learned relational links comprise dynamic links between documents within the hierarchy that are not manually encoded in the documents, that are not known at a time of creation of the documents, and that are generated automatically based on text of the documents;
initiating one of said learned relational links in response to at least one user link selection;
returning the document from the plurality of related documents that corresponds to said learned initiated relational link;
updating a connection strength rating to said learned initiated relational link based on the user link selection and indicating navigation of the user through the hierarchy;
associating said learned initiated relational link with said search parameters;
storing in said database said learned relationally linked documents, said updated connection strength and said learned initiated relational link with said parameters;
returning additional documents from the plurality of related documents; and
recursively associating initiated relational links with said search parameters, wherein at least one of said returning steps include using a clustering algorithm on the hierarchy of the plurality of related documents.

12. The system according to claim 11 wherein assigning a connection strength rating further comprises adjusting said connection strength rating according to the skill level of said user.

13. The system according to claim 11 wherein a connection strength rating is assigned to each of said initiated relational links.

14. The system according to claim 11 further comprising:
displaying subsequent documents from the plurality of hierarchically related documents in response to subsequently initiated relational links; and
recursively assigning a connection strength rating to all relational links selected by said user.

15. The system according to claim 11 further comprising assigning a path rating to the first and last of said initiated relational links.

16. The system according to claim 11 further comprising assigning a path rating to all of said initiated relational links.

17. The system according to claim 11 further comprising periodically adjusting the path rating based on age.

18. The system of claim 11 wherein said search parameters may be absent or alternatively may return all said documents in said database of relationally linked documents.

19. A computer-readable memory having stored therein a set of instructions which, when executed by a processor, causes the processor to retrieve information from a database of relationally linked documents by:
receiving search parameters from a user;
locating an entry point document responsive to said search parameters, the entry point document comprising a root document in a hierarchy of a plurality of related documents;
returning a search result including said entry point document and one or more manual relational links and one or more learned relational links between said entry point document and one or more related documents in the plurality of related documents, wherein the manual relational links comprise relational links between documents within the hierarchy manually encoded in the documents and wherein the learned relational links comprise dynamic links between documents within the hierarchy that are not manually encoded in the documents, that are not known at a time of creation of the documents, and that are generated automatically based on text of the documents;
initiating one of said learned relational links in response to at least one user link selection;
returning the document from the plurality of related documents that corresponds to said learned initiated relational link;
updating a connection strength rating to said learned initiated relational link based on the user link selection and indicating navigation of the user through the hierarchy;
associating said learned initiated relational link with said search parameters;
storing in said database said learned relationally linked documents, said updated connection strength and said learned initiated relational link with said parameters;
returning additional documents from the plurality of related documents; and
recursively associating initiated relational links with said search parameters, wherein at least one of said returning steps include using a clustering algorithm on the hierarchy of the plurality of related documents.

20. The computer-readable memory according to claim 19 wherein assigning a connection strength rating further comprises adjusting said connection strength rating according to the skill level of said user.

21. The computer-readable memory according to claim 19 wherein a connection strength rating is assigned to each of said initiated relational links.

22. The computer-readable memory according to claim 19 further comprising:
displaying subsequent documents from the plurality of hierarchically related documents in response to subsequently initiated relational links; and
recursively assigning a connection strength rating to all relational links selected by said user.

23. The computer-readable memory according to claim 19 further comprising assigning a path rating to the first and last of said initiated relational links.

24. The computer-readable memory according to claim 19 further comprising assigning a path rating to all of said initiated relational links.

25. The computer-readable memory according to claim 19 further comprising periodically adjusting the path rating based on age.

26. The computer-readable memory of claim 19 wherein said search parameters may be absent or alternatively may return all said documents in said database of relationally linked documents.

* * * * *

UNITED STATES PATENT AND TRADEMARK OFFICE
CERTIFICATE OF CORRECTION

PATENT NO. : 8,583,628 B2  Page 1 of 1
APPLICATION NO. : 11/615629
DATED : November 12, 2013
INVENTOR(S) : James Neal Richter, Christopher M Tarabochia and Douglas K. Warner It is certified that error appears in the above-identified patent and that said Letters Patent is hereby corrected as shown below:

On the title page item (73),

Delete "Oracle International Corporation" and insert --Oracle OTC Subsidiary LLC--

Signed and Sealed this
Seventeenth Day of June, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,583,628 B2 | Page 1 of 2 |
| APPLICATION NO. | : 11/615629 | |
| DATED | : November 12, 2013 | |
| INVENTOR(S) | : Richter et al. | |

It is certified that error appears in the above-identified patent and that said Letters Patent is hereby corrected as shown below:

In the Specification,

In column 1, line 61, delete "following" and insert -- follow --, therefor.

In column 3, line 22, delete "mapping of system." and insert -- mapping of help items (a particular type of information item) in a help information item retrieval system. --, therefor.

In column 4, line 18, delete "a contain" and insert -- a tree. Documents can contain a network of other Documents which themselves can contain --, therefor.

In column 4, line 47-48, delete "additional subject" and insert -- additional embodiments of the invention that will be described below and which will form the subject --, therefor.

In column 5, line 10, delete "show" and insert -- shows a --, therefor.

In column 5, line 24, delete "perspective." and insert -- perspective; --, therefor.

In column 5, line 66-67, delete "automated paths." and insert -- automated learning technique algorithms operable to identify patterns in the historical navigation paths. --, therefor.

In column 6, line 30-31, delete "a documents" and insert -- a search inquiry as represented by functional block 102 that is structured to locate documents --, therefor.

In column 8, line 44, delete "learned rating" and insert -- learned implicit rating --, therefor.

In column 10, line 60, delete "hierachy" and insert -- hierarchy --, therefor.

In column 10, line 60, delete "hierachical" and insert -- hierarchical --, therefor.

Signed and Sealed this
Eighth Day of September, 2015

Michelle K. Lee
*Director of the United States Patent and Trademark Office*

CERTIFICATE OF CORRECTION (continued)
U.S. Pat. No. 8,583,628 B2

In column 10, line 61, delete "hierachy" and insert -- hierarchy --, therefor.

In column 12, line 40, delete "now" and insert -- how --, therefor.

In column 16, line 30, delete "sprit" and insert -- spirit --, therefor.